O. H. COURSON.
GUARD FOR WOODWORKING MACHINERY.
APPLICATION FILED SEPT. 19, 1912.
1,154,098.
Patented Sept. 21, 1915.
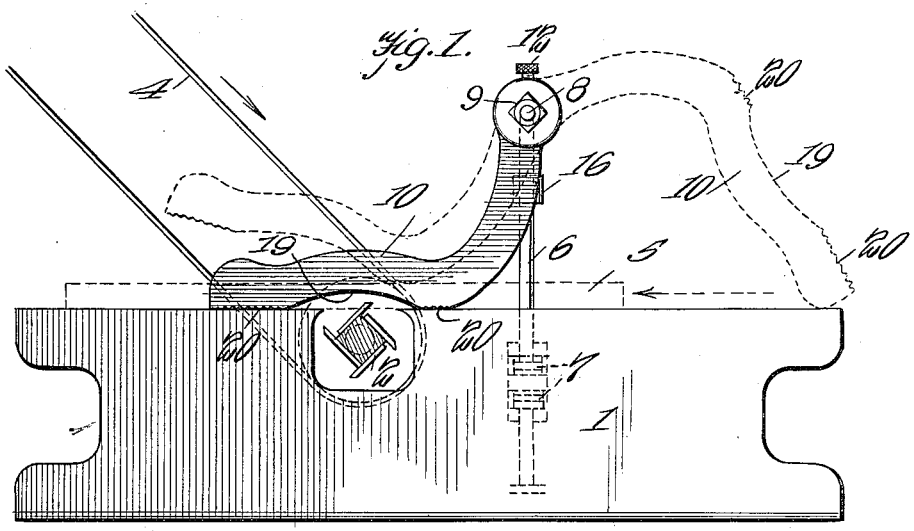
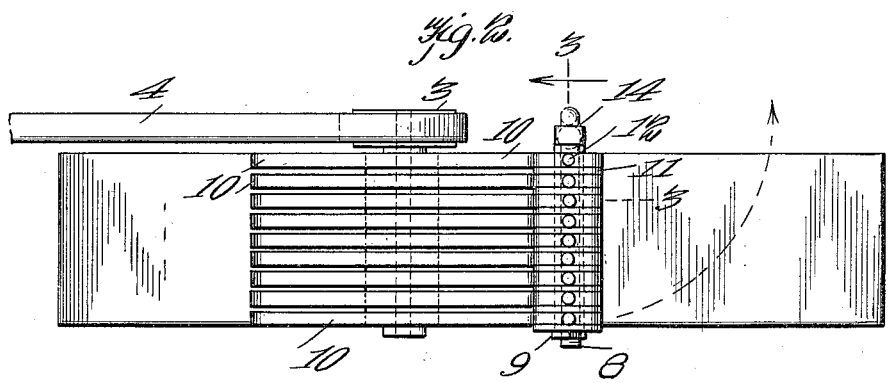
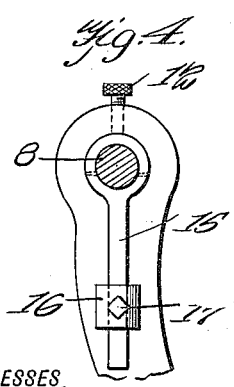
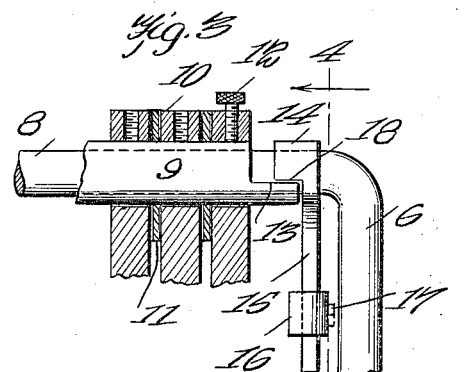
WITNESSES
INVENTOR
OLIVER H. COURSON,
BY
ATTORNEY

UNITED STATES PATENT OFFICE.

OLIVER H. COURSON, OF MEMPHIS, TENNESSEE.

GUARD FOR WOODWORKING MACHINERY.

1,154,098.  Specification of Letters Patent.  Patented Sept. 21, 1915.

Application filed September 19, 1912. Serial No. 721,295.

*To all whom it may concern:*

Be it known that I, OLIVER H. COURSON, a citizen of the United States, residing at Memphis, in the county of Shelby and State of Tennessee, have invented certain new and useful Improvements in Guards for Woodworking Machinery, of which the following is a specification.

This invention relates to a new and useful improvement in combined guards and guides for use in connection with wood working machines, and has for its object to provide a guard which will not only prevent injury to the hands or fingers of the operator, but will also serve as a guide for the stock.

The device is particularly applicable to a machine wherein the cutting tool consists of a rapidly revolving element carrying a plurality of blades or teeth, such as buzz saws, joining machines, etc.

In the accompanying drawings which form a part of this specification, Figure 1 is a side elevation of a joining machine showing my improved guard and guide in operative position; Fig. 2 is a top plan view; Fig. 3 is a view partly in section, taken on line 3—3 of Fig. 2; and Fig. 4 is a partly sectional view taken on line 4—4 of Fig. 3.

In the drawings 1 indicates a work table of any desired form, in which is revolubly mounted a cutter 2, provided with cutting blades adapted to project slightly above the top surface of the table as shown in Fig. 1. Said cutter 2 is connected to a pulley 3, which is turned by a power belt 4, in the usual manner. It will be obvious that, with a machine of this kind, the stock 5 is advanced over the table in the direction of the arrow, and that the cutting teeth, revolving in the opposite direction, will cut or plane the lower face of the stock.

In operating machines of this general character the hands and fingers of the operator are always in great danger from injury, and there are several devices on the market for preventing such injury.

My invention consists of an improved combination of elements in which an upright member 6 is adjustably fastened to the side of the table 1, by spring clips 7, 7 (shown in dotted lines in Fig. 1) or in any other suitable manner. Said member or rod 6 extends upwardly to a point considerably above the table and is then bent at a right angle and extends transversely thereover as shown at 8. Surrounding the rod 8 and adapted to rotate thereon is a sleeve 9, said sleeve carrying a plurality of spring fingers 10, as clearly shown in Figs. 1, 2 and 3. Each finger is separated from the next finger by a washer 11, and carries a set screw 12 extending therethrough.

The spring fingers 10 are normally loosely mounted or pivoted upon the sleeve 9, but, whenever desirable, may be made rigid therewith by tightening the set screws 12. One end of the sleeve 9 is partially cut away, as clearly shown in Fig. 3, forming a shoulder 13. Located upon the rod 8, between the vertical portion 6 and the nearest finger 10, is a ring 14 integral with an arm 15 carrying a weight 16, for a purpose to be hereinafter described. Said weight 16 may be adjusted with respect to the arm 15 by means of a set screw 17. Part of the ring 14 is cut away as clearly shown in Fig. 3, forming a shoulder 18 for engagement with the shoulder 13 on the sleeve 9.

The fingers 10 are preferably made of wood having an inherent resiliency, but may be made of any other material. Said fingers are shaped substantially as shown in Fig. 1, with an upwardly curved portion immediately above the cutting tool. On either side of the curved portion 19 is provided a plurality of corrugations 20 adapted to frictionally engage the stock 5.

In operation the stock 5 is pushed along the table and under the fingers 10, which, being pivoted upon the sleeve 9, rise and allow the stock to pass thereunder. The tool 2, rotating in a direction opposite to the movement of the stock tends to push the stock backward against the action of the power propelling it forwardly. These two forces acting in opposite directions would often cause the stock to buckle up, with the consequent danger to the fingers of the operator. In my device however, the fingers 10 serve to hold the stock upon the table, since the corrugations 20 frictionally engage the stock, and any tendency of the stock to move backwardly would cause the fingers 10 to incline to move backwardly in the arc of a circle circumscribed around the rod 8 as a center. Such movement of the fingers is prevented by the fact that the fingers rest upon the stock, and hence any backward movement of the stock cannot occur unless the fingers are broken, or their frictional resistance overcome.

In order to increase the frictional resistance of the fingers, I employ the construction shown in Fig. 3. In some cases the stock is very tough and it is desired to apply pressure to the fingers to prevent "buckling" of the stock. Normally the fingers move loosely around the sleeve 9, so that said sleeve remains stationary upon the rod 8. Under such circumstances the arm 15 carrying the weight 16 is inoperative and hangs parallel with the vertical rod 6. If it is desired to apply pressure to the stock the set screw 12 may be tightened so that the fingers 10 are rigidly connected with the sleeve 9. It is obvious therefore that, under the circumstances, when the fingers 10 are raised, the sleeve 9 is caused to turn on the rod 8, and that the shoulder 13 on the sleeve 9 will engage the shoulder 18 on the ring 14 and tend to swing the arm 15 out of its vertical position. The weight 16 will of course tend to resume its normal vertical position, with the result that pressure is communicated to the fingers 10 upon the stock 5. By adjusting the position of the weight 16 upon the arm 15 it is obvious that practically any degree of pressure may be obtained. It is of course understood that any prolongation of the sleeve 9 or any lugs secured thereto, would serve the same purpose. The shoulder 18 on the ring 14 might also be dispensed with, under which circumstances the prolongation of the sleeve 9 would engage the under surface of the arm 15, and serve to lift the weight 16 when the sleeve is rotated.

My device is particularly applicable where it is desired to operate upon stock of varying widths and thicknesses. Assuming that the stock is four inches wide, and that the width of each finger is three-fourths of an inch, and the width of each washer one-fourth of an inch. Then when the stock is inserted beneath the fingers, only four of the fingers will be elevated, and the other fingers will remain flat upon the table covering the cutting tool. The stock will of course cover that part of the tool normally covered by the elevated fingers. In this position either edge of the stock is adjacent one of the fingers at rest upon the table, and said fingers form a guide-way for said stock and insure its travel in a straight line. This is an important feature of my invention.

A very particular advantage of my construction resides in the fact that the fingers are movable independently of each other. When it is desired to work upon the edge of a wide board or piece of stock, the stock is run under the fingers, and a number of said fingers, corresponding to the width of the board, are caused to rise, while the other fingers remain in their normal position and cover the ends of the cutters preventing injury to the hands of the operator.

It is obvious that I may employ as many fingers as desired, the purpose being to utilize enough to completely cover the whole length of the cutting tool.

By loosening the spring catches 7, 7, the rod 6 may be turned so that the fingers do not extend over the table, or the fingers may be swung backwardly over the rod so as to uncover the cutting tool, as shown in dotted lines to the right of Fig. 1.

It is obvious that certain changes may be made in the construction shown in the drawings without departing from the scope of my invention.

Having thus described my invention what I claim and desire to secure by Letters Patent is:

1. In a device of the class described, in combination with a cutter, a rod mounted near the cutter, a sleeve rotatable on said rod, a finger normally loosely mounted upon said sleeve, extending over the cutter and bearing upon the stock, means for tightening said finger upon said sleeve, and coacting means upon said rod and sleeve adapted to increase the pressure of the finger upon the stock.

2. In a device of the class described, in combination with a cutter, a rod mounted near the cutter, a sleeve rotatable on said rod, a finger normally loosely mounted upon said sleeve, extending over the cutter and upon the stock, means for tightening said finger upon said sleeve, and a weight carried by the rod and adapted to impart pressure to said finger.

3. In a device of the class described, the combination with a cutter of a rod mounted near the cutter, a sleeve rotatable upon said rod, a finger normally loosely rotatable on said sleeve and extending over the cutter and bearing upon the stock, means for securing said finger against rotation, an arm rotatable upon said rod and carrying an adjustable weight, and means permitting the engagement of said arm and said sleeve whereby said weight is adapted to increase the pressure of the finger upon the stock.

In testimony whereof I affix my signature in presence of two witnesses.

OLIVER H. COURSON.

Witnesses:
  N. CURTIS LAMMOND,
  RUSSELL L. STEVENS.